United States Patent [19]
Kleineberg et al.

[11] Patent Number: 5,915,101
[45] Date of Patent: Jun. 22, 1999

[54] ARBITRATION IN THE CASE OF A DELAYING BUS COUPLING

[75] Inventors: Michael Kleineberg, Lichtenau; Ralph Zacharias, Bad Lippspringe, both of Germany

[73] Assignee: Siemens Nixdorf Informationsysssteme Aktiengesellschaft, Paderborn, Germany

[21] Appl. No.: 08/765,709

[22] PCT Filed: Jul. 4, 1995

[86] PCT No.: PCT/DE95/00865

§ 371 Date: Jan. 15, 1997

§ 102(e) Date: Jan. 15, 1997

[87] PCT Pub. No.: WO96/03696

PCT Pub. Date: Feb. 8, 1996

[30] Foreign Application Priority Data

Jul. 22, 1994 [DE] Germany .............................. 44 26 123

[51] Int. Cl.[6] .......................... G06F 13/36; G06F 13/368
[52] U.S. Cl. ........................ 395/287; 395/728; 395/308; 395/856
[58] Field of Search .................... 395/287, 728, 395/308, 200.83, 856, 200.55, 299, 730; 370/447

[56] References Cited

U.S. PATENT DOCUMENTS

| | | | |
|---|---|---|---|
| 4,845,722 | 7/1989 | Kent et al. ............................ | 370/388 |
| 5,237,695 | 8/1993 | Skokan et al. ...................... | 395/200.55 |
| 5,528,765 | 6/1996 | Milligan .................................. | 395/287 |
| 5,561,669 | 10/1996 | Lenney et al. ......................... | 370/352 |
| 5,566,345 | 10/1996 | Ostrowski ............................... | 395/822 |
| 5,577,207 | 11/1996 | Pauget et al. ......................... | 395/200.6 |

FOREIGN PATENT DOCUMENTS 0 384 621 A2  8/1990  European Pat. Off. .
0 540 001 A1  5/1993  European Pat. Off. .

Primary Examiner—Gopal C. Ray
Attorney, Agent, or Firm—Hill & Simpson

[57] ABSTRACT

Bus segments are connected using interconnected coupling units that are connected to one bus segment each. The coupling units are essentially similar, and the bus segments respectively use one arbitration procedure. The respective arbitration procedure permits interruption by the respective coupling unit without the coupling unit for this purpose obtaining control over the bus segment connected to it. At most one of the coupling units has a state A authorizing arbitration while all the others have a state B not authorizing arbitration. If a coupling unit is in the state B not authorizing arbitration, it itself interrupts all arbitration on the bus segment connected to it without for this purpose obtaining control over just this bus segment, and transmits at least one request at least to the coupling unit in the state A authorizing arbitration. If a coupling unit in the state A authorizing arbitration receives a request, it transmits an authority to the requesting coupling unit and simultaneously changes into the state B not authorizing arbitration without acting on the bus segment connected to it in the process. A coupling unit changes into the state A authorizing arbitration by receiving an authorization.

12 Claims, 2 Drawing Sheets

ARBITRATION IN THE CASE OF A DELAYING BUS COUPLING

BACKGROUND OF THE INVENTION

The method relates to the coupling of bus systems accompanied by arbitration.

Bus systems such as the "Small Computer System Interface" (SCSI) permit arbitration, that is to say a dynamic priority-controlled bus usage by each connected device. The length of this bus system is limited by the prescribed reaction times. Certainly bus couplers are possible which connect two short bus segments in a noise-proof fashion, for example via an optical connection; the propagation time of the signals limits these connections as well to a length of a few meters, however, although the optical connection would permit distances in the range of kilometers.

SUMMARY OF THE INVENTION

The object of the invention is therefore to provide a bus coupling which couples two bus segments transparently, that is to say by faithfully following the prescribed protocols, and permits reliable arbitration even in the case of long propagation times on the connection.

The invention is based on the observation that arbitrating bus systems permit an interruption of the arbitration sequence. The two coupling units coupling two bus segments transfer the authority to arbitrate between one another when required. If arbitration is attempted on a bus segment whose coupling unit has the authority to arbitrate, the arbitration is carried out normally. If the coupling unit does not have the authority, it requests it from the other coupling unit and simultaneously interrupts the arbitration. The device which has attempted to access the bus repeats this attempt after a short time. If the remote bus segment was inactive, the remote coupling unit immediately relinquishes the authority to arbitrate; the latter is then available upon the next attempt of the device attempting access. If it was active, the segment here is also active via the bus coupling; and the device repeats the attempt to access after the bus has become inactive (free).

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
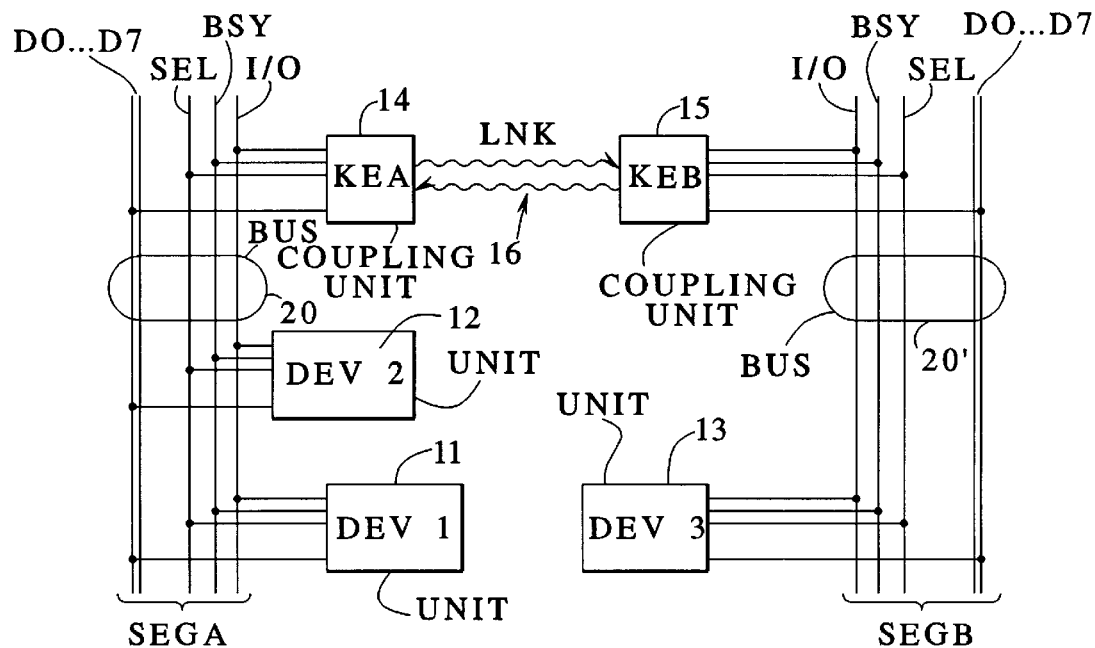
FIG. 1 shows the arrangement of two bus segments with associated couplers and three devices.

The structure of a bus coupling is depicted in FIG. 1. Two coupling units KEA and KEB are interconnected via a connection LNK whose design is explained further below. SEGA and SEGB are two bus segments which are connected by the coupling units KEA and KEB. Two devices DEV1 and DEV2 are connected on the segment SEGA; a device DEV3 is connected on the segment SEGB. Further devices are connected in a similar way. Of the bus segments, only the data lines D0 . . . D7 of importance below and the control lines SEL, BSY and I/O are represented. Further control lines are present but not of importance for the invention and are therefore not represented for reasons of clarity.

A connection of two devices on the same segment, for example from DEV1 to DEV2 is performed without the couplers KEA and KEB being required to transmit the user data. A connection between the segments, for example from DEV1 to DEV3, requires the couplers for transmitting the user data. However, the status is transmitted even in the first case; for the sake of simplicity, the transmission of the user data is conventional and without disadvantages. The "Small Computer System Interconnect", SCSI, is used for the following description as the bus system; it is described, for example, in the ANSI Standard X3.1 31-1986 and is taken as known below.

The SCSI bus can operate up to eight different devices, to which one of the eight data lines D0 . . . D7 is assigned during arbitration. The data lines are operated by drivers with an open collector, with the result that switched ORing of the signals is performed on the bus and is permissible. The possible additional data line for a parity bit is not used in this example.

Furthermore, signal lines BSY, SEL and I/O are present. In the SCSI specification, further control lines are named, for which the control line I/O is given as representative. Only the signals SEL and BSY are important for arbitration. These signals are also operated using switched ORing via drivers with an open collector. The control lines can assume the two digital states L or "negated" and H or "asserted". The various permissible combinations of the states of the control lines are referred to as bus states.

The idle state of the bus system is signalized by the signals SEL and BSY both being L. The device DEV1 requests the use of the bus by an arbitration cycle by setting the signal BSY to H and simultaneously activating the bit on the data lines which corresponds to its address. After a fixed, predetermined waiting time, the "arbitration delay" of 2.2 $\mu$s, the device checks whether a bit with a higher number is activated or the self-set bit is that with the highest number. In the first case, a device of higher priority has taken over the control, while in the latter case the authority to control belongs to the requesting device. The device with the authority to control sets the signal SEL to H and takes over the control of the bus system. The arbitration is therefore terminated; this is followed by bus states for the data transfer, which are concluded by a transition to the idle state IDLE. By setting the signal I/O and the further signals, the bus states are set for the data transfer, and data transmission is carried out in a known way with the aid of the data lines. The arbitration method thereby ensures that always only one device at a time takes over the control function of the bus. The other device waits until the idle state has been reached again, and then attempts anew to acquire the authority to control by an arbitration cycle.

The couplers KEA continuously monitor the bus state on the bus assigned to them. The activation of BSY by the device DEV1 is detected. Thereupon, a message which contains the new bus state and the state of the data lines is sent to the remote coupler KEB via the connection LNK. The remote coupling unit KEB now for its part, as a representative for the device DEV1, as it were, switches the new bus state and sets the data lines. If, by chance, the device DEV3 simultaneously attempts on the remote bus segment SEGB to use the bus, the remote coupling unit detects this and sends a message to the coupling unit KEA which, for its part, produces on the bus segment SEGA the same state as on the bus segment SEGB and thus prevents the device DEV1 from using the bus. It is clear that the exchange of messages between the couplers KEA and KEB must be performed at such a rate that at least one message can be sent out and a second can be sent back within the prescribed time limit of 2.4 μs. Prescribed logging and settling times shorten this interval further. Consequently, the propagation time of the connection is limited to less than 200 ns. Like optical conductors as well, line-bound electromagnetic waves have a delay time of more than 5 μs per kilometer, with the result that according to the prior art a connection with a length of more than 25 m is not possible.

In the following data transfer phases, any change in the bus state is detected in the same way by the couplers KEA and KEB, fed via a message to the respective other coupler and placed by the latter on the bus connected to it.

Figure 2:
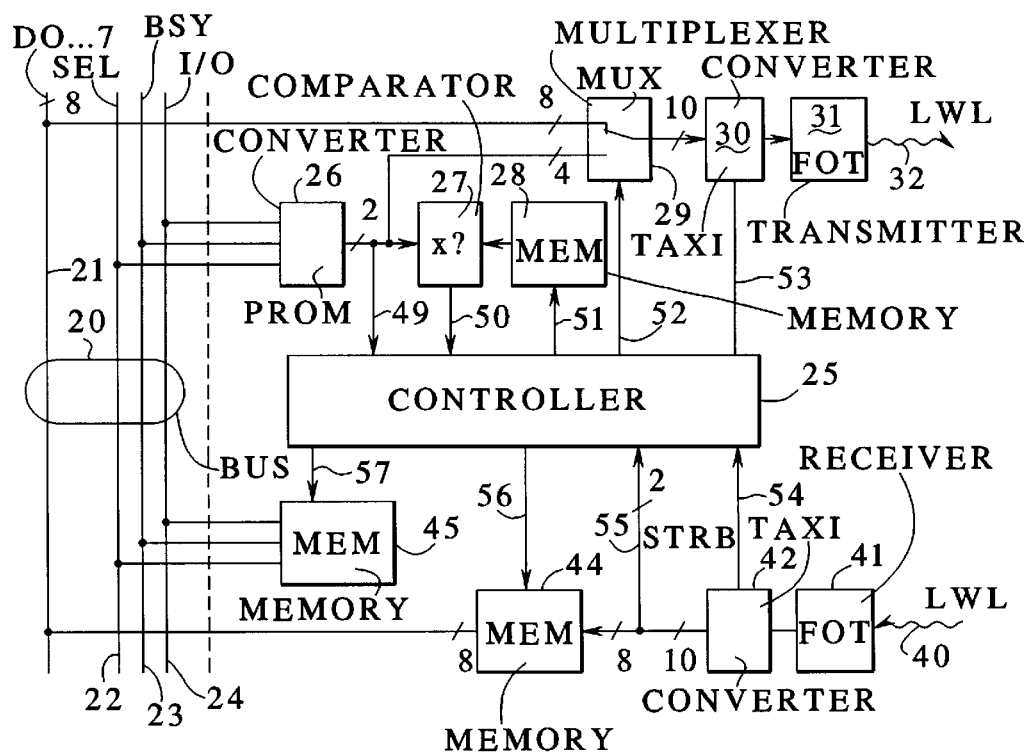
FIG. 2 shows a diagrammatic circuit for a coupler.

A circuit for a coupler is represented diagrammatically in FIG. 2. The message transmission is performed via optical conductors 32, 40, whose light signals are converted into electric signals via the optical receiver 41 and transmitter 31 of type V23804-E2-T5 and V23800-S2-T5 from Siemens, and converted by serial-parallel converters 30, 42, designated as "TAXI Chips", from AMD of type AM 79168 and AM 79169. Using these components, each of the two couplers can transmit a message ten bits long to the other coupler in full-duplex operation.

The controller 25 monitors the state, indicated by the signal lines SEL, BSY and I/O, of the controlled bus 20 due to the fact that said signal lines are coded by a converter 26 and compared in the comparator 27 with the previously valid state stored in the memory 28. In the event of inequality, the state number is read via the connection 49 and written into the compare memory via the connection 51. At the same time, via the connection 52 between the controller 25 and a multiplexer this new state number is applied to the data input of the transmit TAXI 30, which is subsequently asked to transmit the state by a strobe 53. Immediately thereafter, the multiplexer 29 is switched back and the value of the data signals is also transmitted to the transmit TAXI by a second strobe. In this case, the 10th bit is wired by the multiplexer such that it is situated at L in the case of data signals and at H in the case of status numbers.

At the receiving end, the serial signals are provided in parallel in the receive TAXI 42 and passed via a strobe 54 to the controller, which can evaluate these via the connection 55. If the 10th bit is at H, a changed status is present; this is stored internally by the controller and written into a memory 45 via the connection 57 and sets the new status signals. If the 10th bit is L, a data word is present which is taken over into the memory 44 via the strobe signal 56 and switched from there onto the data bus 21. In this case, the fixed bus protocol decides whether, as described, it is firstly the new status and then the new data or, vice versa, firstly the new data and then the new status which is activated.

There are thus two types of messages which are exchanged by the coupling units: data messages, which contain a changed state of the data bus; and state messages, which denote a changed bus state. Since the number of the bus states is far below the number of the data states, not all coding possibilities for the state messages are exhausted.

Figure 3:
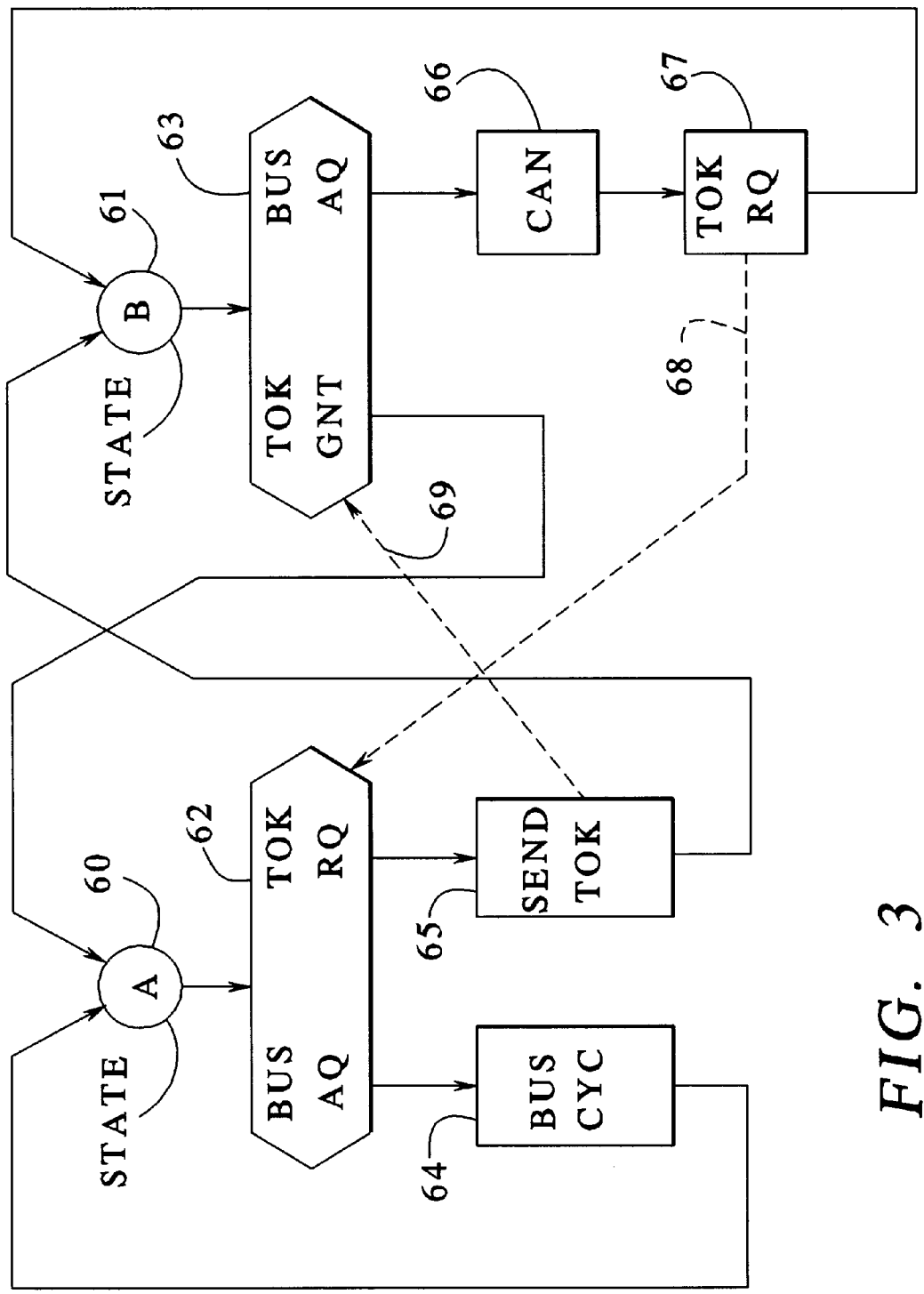
FIG. 3 shows the sequence in the arbitration according to the invention.

These processes described so far apply to every bus coupling, and thus to those according to the prior art. The invention consists in a response of the controller by means of which the latter becomes active with the aid of the status changes. The sequence is represented in FIG. 3 to the extent that the invention is affected.

Each controller is either in state A, in which it has authority to arbitrate, or in state B, in which it does not have authority to arbitrate. In step 62, a controller with authority to arbitrate waits for one of two events, specifically either a state change on the bus which starts an arbitration cycle; designated as BUS AQ and obtained as a change in state via the connections 50 and 49. Alternatively, a message TOK RQ can also arrive via the connections 54 and 55 from the receive TAXI. In the first case (BUS AQ), a normal bus cycle proceeds in step BUS CYC, 64, and the associated data are sent via the connection. In the second case, a device has started an arbitration cycle on the bus connected to the distant station and, as represented further below and represented by a dashed arrow 68, a message TOK RQ is sent. This message does not belong to the set of the permissible changes of state, but is taken from the set of the coding possibilities not yet exhausted. The controller detects this and switches the data content neither to the control lines nor to the data bus, but simply evaluates the message internally. As a reaction to this, the controller for its part produces a message TOK GNT, switches the multiplexer 29 appropriately and transmits this message to the distant station. This message is also taken from the set of the coding possibilities not yet exhausted. Since the controller has no more authority to arbitrate, it goes over into the state B, 61, without authority to arbitrate.

This is the state in which the distant station was and waited in step 63 for one of two events. The controller obtains the authority to arbitrate with the arrival of the message TOK GNT (represented by a dashed arrow 69), and goes over into the state A, 60, with authority to arbitrate. The changes of state then possible have already been described.

In the case of a station without authority to arbitrate, a device can also start an arbitration cycle on its own bus as an alternative to the arrival of the message TOK GNT. This is established by the controller in the way described. The arbitration cycle is interrupted, as described more precisely, by setting the control lines via the connection 57 and the memory driver 45. At the same time, as indicated by the dashed line 68, in step 67 the controller transmits a token request TOK RQ to the remote controller in the same way as the token delivery. The controller remains in state B, 61, until the receipt of the message TOK GNT. The receipt of the token request TOK RQ is processed by the distant station as described above. If a token request is received at a controller while a bus cycle 64 is being carried out, this request is stored until the bus is in the idle state at the controller, and only then is the authority issued. The station without authority to arbitrate correspondingly interrupts the bus cycles until the token message has been received.

Arbitration can be interrupted by early setting of the signal SEL within the "bus clear delay" of 800 ns. Since this process can be decided by the coupling unit with the aid of its own status, it can always be performed in good time independently of the propagation time on the transmission lines.

In the coupling described, the bus state is produced on the remote bus segment even in the case of communication of two devices on the same bus segment, although the devices connected there do not evaluate the data. This is required so that the devices do not initiate any arbitration cycles on the remote bus segment. This is also unavoidable in the case of an SCSI bus, in which the destination address is not known during arbitration and an interruption is not possible after arbitration.

In other bus systems, in which during arbitration the destination address is also included, each coupling unit can be designed such that it contains a table, possibly dynamically structured, of the device addresses connected to its bus segment, and in the case of connections which proceed locally on the bus segment does not interrupt these during the arbitration phase. If the destination address is not in this table and if the coupler does not have the authority to arbitrate, it interrupts the arbitration and requests authorization in the way described.

Instead of the 10-bit long message transmission described, it is also possible, for example, to use a 16-bit long transmission in which data and state are transmitted simultaneously. In this case, given 8 bits data and 1 bit parity for the data 7 bits would remain for the state. In the case of the two messages TOK RQ and TOK GNT, the controller then ignores the data part.

Instead of a point-to-point connection, a bus system with a plurality of subscribers is also possible as a coupling. Here, the requester of a TOK RQ is then known through the addressing in this bus system. The TOK GNT is then sent to said requester. The fiber optic system FDDI, in particular, is especially suitable because of the high transmission rate and guaranteed transmission time.

Furthermore, the invention can be used when the transmission time of the device connecting the couplers is not known. This is the case, for example, when the coupling is performed via Ethernet or IEEE 802.3. In the case of transmission of messages via Ethernet, for example, collisions on the network can require a further transmission attempt until a message can be transmitted to the remote coupling unit. The invention therefore also permits coupling of SCSI bus systems via an Ethernet connection, which has so far been completely impossible because of said characteristic.

Thus, the invention also permits the connection of three or more bus segments. Only one of the couplers has the authority to arbitrate. Either the broadcast characteristic of a network is used in order to transmit the request to all other couplers simultaneously. Or a coupler issuing the authority transmits a third message to the other couplers that the authority has been passed to another coupler.

The invention was described with the aid of the SCSI bus system, in which an arbitration phase is frequently followed by a data transfer phase which is long by comparison therewith and during which the transmitting device does not release the bus. A connection which is not disturbed by competing attempts to access is expected during the data transmission phase. This observation holds true in the same way for further bus systems such as Multibus II or VME bus, which likewise provide arbitration and permit the latter to be interrupted. The 12L system, in which arbitration takes place during the address phase, can also be coupled by the invention.

It is, furthermore, conceivable that the bus systems to be connected are not identical but can be interrupted during arbitration. One of the two coupling units must then carry out a protocol conversion. This can be performed by recording in a table in addition to each bus state of the first bus system the corresponding bus state of the second bus system, and by the converting coupling unit converting the states using a known programing technique in accordance with this table. In particular, it is possible in this way to connect SCSI-I with an 8-bit data length in accordance with SCSI-II with a 16-bit data length.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for connecting bus segments by means of interconnected coupling units connected to one bus segment each, comprising the steps of:

providing substantially similar coupling units;

using one arbitration procedure for the bus segments;

permitting via the arbitration procedure interruption by a respective coupling unit without the respective coupling unit obtaining control over the bus segment connected thereto;

providing that at most one of the coupling units has a state A authorizing arbitration while all other coupling units have a state B not authorizing arbitration;

providing that if a respective coupling unit is in the state B not authorizing arbitration, the respective coupling unit itself interrupts all arbitration on the bus segment connected without obtaining control over just this bus segment, and the respective coupling unit transmitting at least one request at least to the coupling unit in the state A authorizing arbitration;

providing that if a respective coupling unit in the state A authorizing arbitration receives a request, the respective coupling unit transmits an authority to the requesting coupling unit and simultaneously changes into the state B not authorizing arbitration without acting on the bus segment connected thereto in the process; and providing that a coupling unit chances into the state A authorizing arbitration by receiving an authorization.

2. The method as claimed in claim 1, wherein the request is stored if valid and the authorization is not transmitted until arbitration is possible on the bus segment connected.

3. The method as claimed in claim 2, wherein an additional waiting time, in which the bus segment is free, elapses before the authorization is issued.

4. The method as claimed in claim 1, wherein the bus segments use the Small Computer System Interface.

5. The method as claimed in claim 4, wherein the interruption of arbitration is performed by activating a predetermined signal via a coupling unit at a start of an arbitration phase.

6. The method as claimed in claim 4, wherein interruption of arbitration is performed by activating a predetermined signal via a coupling unit at a start of an arbitration phase and before an end of a bus set delay time.

7. The method as claimed in claim 1, wherein optical transmission via glass fiber connections connect the coupling units.

8. The method as claimed in claim 7, wherein an FDDI fiber optic system connects the coupling units.

9. The method as claimed in claim 1, wherein a network with competing access is used to connect the coupling units.

10. The method as claimed in claim 1, wherein more than two coupling units are connected by a network and wherein the request is transmitted to all the coupling units as a broadcast.

11. The method as claimed in claim 1, wherein more than two coupling units are connected by a network, and wherein in addition to the authorization transmitted to the requesting coupling unit the coupling unit issuing the authorization transmits an information message to the further coupling units.

12. The method as claimed in claim 1, wherein each coupling unit has a table of known devices on the bus segment connected thereto and does not interrupt arbitration when a destination address and a source address are situated in just this bus segment.

* * * * *